US009934368B2

(12) United States Patent
Patton et al.

(10) Patent No.: US 9,934,368 B2
(45) Date of Patent: Apr. 3, 2018

(54) USER-GENERATED CONTENT PERMISSIONS STATUS ANALYSIS SYSTEM AND METHOD

(71) Applicant: Banjo, Inc., Redwood City, CA (US)

(72) Inventors: Damien Patton, Palo Alto, CA (US); Rish Mehta, Redwood City, CA (US)

(73) Assignee: Banjo, Inc., Redwood City, CA (US)

( * ) Notice: Subject to any disclaimer, the term of this patent is extended or adjusted under 35 U.S.C. 154(b) by 0 days.

(21) Appl. No.: 15/250,735

(22) Filed: Aug. 29, 2016

(65) Prior Publication Data

US 2016/0371471 A1 Dec. 22, 2016

Related U.S. Application Data

(63) Continuation-in-part of application No. 14/971,607, filed on Dec. 16, 2015, and a continuation-in-part of application No. 14/882,318, filed on Oct. 13, 2015, now abandoned, which is a continuation-in-part of application No. 14/643,958, filed on Mar. 10, 2015, (Continued)

(51) Int. Cl.
| | |
|---|---|
| *G06F 21/10* | (2013.01) |
| *G06F 17/30* | (2006.01) |
| *G06F 21/62* | (2013.01) |
| *H04L 29/06* | (2006.01) |
| *H04W 4/02* | (2018.01) |
| *G06F 21/55* | (2013.01) |

(52) U.S. Cl.
CPC ........ *G06F 21/10* (2013.01); *G06F 17/30241* (2013.01); *G06F 17/30864* (2013.01); *G06F 17/30867* (2013.01); *G06F 21/554* (2013.01); *G06F 21/6218* (2013.01); *G06F 21/6245* (2013.01); *H04L 63/102* (2013.01); *H04W 4/021* (2013.01); *G06F 2221/2115* (2013.01); *G06F 2221/2141* (2013.01)

(58) Field of Classification Search
CPC ............... G06F 21/10; G06F 17/30864; G06F 21/6245; G06F 17/30867; G06F 17/30241; G06F 21/6218; G06F 2221/2115; G06F 2221/2141; H04W 4/021; H04L 63/102
See application file for complete search history.

(56) References Cited

U.S. PATENT DOCUMENTS

| | | | |
|---|---|---|---|
| 6,542,749 | B2 | 4/2003 | Tanaka et al. |
| 6,542,750 | B2 | 4/2003 | Hendrey et al. |

(Continued)

FOREIGN PATENT DOCUMENTS

| | | |
|---|---|---|
| WO | 2004075594 A | 9/2004 |
| WO | 2011043946 A | 4/2011 |
| WO | 2012109488 A | 8/2012 |

OTHER PUBLICATIONS

Espinoza et al. "GeoNotes: Social and Navigational Aspects of Location-Based Information Systems," 2001, Ubicomp2001, LNC2201, pp. 2-17.

(Continued)

*Primary Examiner* — Mahfuzur Rahman
(74) *Attorney, Agent, or Firm* — Jeffrey Schox; Diana Lin

(57) ABSTRACT

A method for user-generated content privacy control, including: detecting a trigger event, identifying a post for permissions analysis, determining permissions for the post, and storing the updated permissions in a post indexing system.

19 Claims, 5 Drawing Sheets

Related U.S. Application Data now Pat. No. 9,652,525, which is a continuation-in-part of application No. 14/574,966, filed on Dec. 18, 2014, now Pat. No. 9,043,329, and a continuation-in-part of application No. 14/501,436, filed on Sep. 30, 2014, now abandoned, which is a continuation-in-part of application No. 14/043,479, filed on Oct. 1, 2013, now abandoned.

(60) Provisional application No. 62/093,749, filed on Dec. 18, 2014, provisional application No. 62/063,078, filed on Oct. 13, 2014, provisional application No. 61/918,126, filed on Dec. 19, 2013, provisional application No. 62/060,407, filed on Oct. 6, 2014, provisional application No. 62/006,632, filed on Jun. 2, 2014, provisional application No. 61/709,103, filed on Oct. 2, 2012, provisional application No. 61/782,687, filed on Mar. 14, 2013, provisional application No. 61/784,809, filed on Mar. 14, 2013, provisional application No. 61/885,322, filed on Oct. 1, 2013.

(56) References Cited

U.S. PATENT DOCUMENTS

| | | |
|---|---|---|
| 6,618,593 B1 | 9/2003 | Drutman et al. |
| 6,771,970 B1 | 8/2004 | Dan |
| 6,944,443 B2 | 9/2005 | Bates et al. |
| 7,107,447 B2 | 9/2006 | Sanin et al. |
| 7,437,444 B2 | 10/2008 | Houri |
| 7,478,157 B2 | 1/2009 | Bohrer et al. |
| 7,614,002 B2 | 11/2009 | Goldfeder et al. |
| 7,711,781 B2 | 5/2010 | Davis et al. |
| 7,844,254 B2 | 11/2010 | Arnold et al. |
| 7,849,204 B2 | 12/2010 | Yared et al. |
| 7,908,647 B1 | 3/2011 | Polis et al. |
| 7,917,154 B2 | 3/2011 | Fortescue et al. |
| 7,917,594 B2 | 3/2011 | Reding et al. |
| 7,996,464 B1 | 8/2011 | Wang et al. |
| 8,046,003 B2 | 10/2011 | Lovell, Jr. |
| 8,046,418 B1 | 10/2011 | Denise |
| 8,117,281 B2 | 2/2012 | Robinson et al. |
| 8,122,516 B2 | 2/2012 | Cuellar et al. |
| 8,155,669 B2 | 4/2012 | Ziskind et al. |
| 8,165,604 B2 | 4/2012 | Ziskind et al. |
| 8,225,376 B2 | 7/2012 | Zuckerberg et al. |
| 8,311,973 B1 | 11/2012 | Zadeh |
| 8,327,451 B2 | 12/2012 | Duri et al. |
| 8,331,958 B2 | 12/2012 | Hein et al. |
| 8,347,317 B1 | 1/2013 | Balaji et al. |
| 8,447,852 B1 | 5/2013 | Penumaka et al. |
| 8,484,224 B1 | 7/2013 | Harris et al. |
| 8,484,241 B2 | 7/2013 | Bouse et al. |
| 8,489,127 B2 | 7/2013 | Huang et al. |
| 8,504,061 B2 | 8/2013 | Grainger et al. |
| 8,756,178 B1 | 6/2014 | Bruckhaus et al. |
| 8,943,054 B2 | 1/2015 | Caruso |
| 8,943,135 B2 | 1/2015 | Johnmar |
| 9,141,656 B1 | 9/2015 | Lopyrev et al. |
| 9,262,517 B2 | 2/2016 | Feng et al. |
| 2002/0080173 A1 | 6/2002 | Tagami et al. |
| 2002/0090954 A1 | 7/2002 | Tanaka et al. |
| 2002/0107008 A1 | 8/2002 | Hendrey et al. |
| 2003/0037110 A1 | 2/2003 | Yamamoto |
| 2004/0075752 A1 | 4/2004 | Valleriano et al. |
| 2004/0259581 A1 | 12/2004 | Crisler et al. |
| 2006/0224587 A1 | 10/2006 | Zamir et al. |
| 2008/0070593 A1 | 3/2008 | Altman et al. |
| 2008/0114835 A1 | 5/2008 | Mu et al. |
| 2008/0114847 A1 | 5/2008 | Ma et al. |
| 2008/0115082 A1 | 5/2008 | Simmons et al. |
| 2008/0222170 A1 | 9/2008 | Farnham et al. |
| 2008/0228695 A1 | 9/2008 | Sifry et al. |
| 2009/0063419 A1 | 3/2009 | Nurminen et al. |
| 2009/0064144 A1 | 3/2009 | Abhyanker |
| 2009/0083378 A1 | 3/2009 | Lingafelt et al. |
| 2009/0123025 A1 | 5/2009 | Deng et al. |
| 2009/0177484 A1 | 7/2009 | Davis et al. |
| 2009/0254840 A1 | 10/2009 | Churchill et al. |
| 2009/0286605 A1 | 11/2009 | Rick et al. |
| 2010/0017216 A1 | 1/2010 | Chakra et al. |
| 2010/0050245 A1 | 2/2010 | Samatov |
| 2010/0076968 A1 | 3/2010 | Boyns et al. |
| 2010/0125605 A1 | 5/2010 | Nair et al. |
| 2010/0203901 A1 | 8/2010 | Dinoff et al. |
| 2011/0035264 A1* | 2/2011 | Zaloom ................. G06Q 10/10 705/14.12 |
| 2011/0066743 A1 | 3/2011 | Hurley et al. |
| 2011/0113119 A1 | 5/2011 | Frazier et al. |
| 2011/0161987 A1 | 6/2011 | Huang et al. |
| 2011/0177829 A1 | 7/2011 | Platt et al. |
| 2011/0208681 A1 | 8/2011 | Kuecuekyan |
| 2011/0218946 A1 | 9/2011 | Stern et al. |
| 2011/0225178 A1 | 9/2011 | Ingrassia et al. |
| 2011/0230161 A1 | 9/2011 | Newman |
| 2011/0238759 A1 | 9/2011 | Spataro et al. |
| 2012/0001928 A1 | 1/2012 | Sheha et al. |
| 2012/0011189 A1 | 1/2012 | Werner et al. |
| 2012/0136865 A1 | 5/2012 | Blom et al. |
| 2012/0166964 A1 | 6/2012 | Tseng |
| 2012/0245887 A1 | 9/2012 | Spears et al. |
| 2013/0007148 A1 | 1/2013 | Olsen |
| 2013/0035983 A1 | 2/2013 | Kursar et al. |
| 2013/0073473 A1* | 3/2013 | Heath ................. G06Q 30/02 705/319 |
| 2013/0073686 A1 | 3/2013 | Sandholm |
| 2013/0099977 A1 | 4/2013 | Sheshadri et al. |
| 2013/0110631 A1 | 5/2013 | Mitchell et al. |
| 2013/0117365 A1 | 5/2013 | Padmanabhan et al. |
| 2013/0129142 A1 | 5/2013 | Miranda-Steiner |
| 2013/0148864 A1 | 6/2013 | Dolson et al. |
| 2013/0225196 A1 | 8/2013 | James et al. |
| 2014/0089775 A1 | 3/2014 | Worsley et al. |
| 2014/0149846 A1* | 5/2014 | Ansel ................. G06F 17/3089 715/234 |
| 2014/0201126 A1 | 7/2014 | Zadeh et al. |
| 2014/0207865 A1* | 7/2014 | Carr ................. H04L 67/2833 709/204 |
| 2014/0222704 A1 | 8/2014 | Abhyanker |
| 2014/0244742 A1 | 8/2014 | Yu et al. |
| 2014/0330732 A1 | 11/2014 | Grignon |
| 2014/0337317 A1 | 11/2014 | Woss et al. |
| 2015/0006333 A1* | 1/2015 | Silveira ............. G06Q 30/0641 705/27.1 |
| 2016/0103903 A1 | 4/2016 | Vivalda et al. |
| 2016/0196584 A1* | 7/2016 | Franklin ............ G06Q 30/0267 705/14.64 |
| 2017/0228384 A1 | 8/2017 | Caruso et al. |

OTHER PUBLICATIONS

Karimi, Hassan A., et al. "SoNavNet: a framework for social navigation networks." Proceedings of the 2009 International Workshop on Location Based Social Networks. ACM, 2009.

Lee et al. (Discovery of unusual regional social activities using geo-tagged microblogs, World Wide Web (2011) 14:321-349, Published online: Mar. 1, 2011).

Liu et al. (Using Social Media to Identify Events, WSM'11, Nov. 30, 2011, 6 pages).

Paul (Tutorial: consuming Twitter's real time stream API in Python, Apr 21, 2010 5:45pm UTC, 4 pages).

Yang et al. (A Language for Automatically Enforcing Privacy Policies, POPL'12 =, Jan. 25-27, 2012, 13 pages).

* cited by examiner

USER-GENERATED CONTENT PERMISSIONS STATUS ANALYSIS SYSTEM AND METHOD

CROSS-REFERENCE TO RELATED APPLICATIONS

This application is a continuation-in-part of U.S. application Ser. No. 14/971,607 filed 16 Dec. 2015 which claims the priority of U.S. Provisional Application No. 62/093,749 filed 18 Dec. 2014, which are incorporated in their entireties by this reference.

This application is a continuation-in-part of U.S. application Ser. No. 14/882,318 filed 13 Oct. 2015, which claims the priority of U.S. Provisional Application No. 62/063,078 filed 13 Oct. 2014 and is a continuation-in-part of U.S. application Ser. No. 14/643,958 filed 10 Mar. 2015. Application Ser. No. 14/643,958 is a continuation-in-part of U.S. application Ser. No. 14/574,966, filed 18 Dec. 2014, which claims the benefit of U.S. Provisional Application No. 61/918,126, filed 19 Dec. 2013, U.S. Provisional Application No. 62/060,407, filed 6 Oct. 2014, and U.S. Provisional Application No. 62/006,632, filed 2 Jun. 2014. Application Ser. No. 14/643,958 is also a continuation-in-part of application Ser. No. 14/501,436 filed 30 Sep. 2014, which is a continuation-in-part of application Ser. No. 14/043,479, filed 1 Oct. 2013, which claims the benefit of U.S. Provisional Application No. 61/709,103, filed 2 Oct. 2012, U.S. Provisional Application No. 61/782,687, filed 14 Mar. 2013, and U.S. Provisional Application No. 61/784,809, filed 14 Mar. 2013. Application Ser. No. 14/501,436 also claims the benefit of U.S. Provisional Application No. 61/885,322, filed 1 Oct. 2013, U.S. Provisional Application No. 61/918,126, filed 19 Dec. 2013, and U.S. Provisional Application No. 62/006,632, filed 2 Jun. 2014. All of the aforementioned applications are incorporated herein in their entireties by this reference.

TECHNICAL FIELD

This invention relates generally to the social networking post analysis field, and more specifically to a new and useful system and method for dynamic permissions determination in the social networking post analysis field.

BACKGROUND

A problem arises when user-generated content is requested by a third party system from a post analysis system that aggregates social networking system posts. While the analysis system may have access to the post (e.g., through access granted by the authoring user account or connection of the authoring account), the third party may not have access to the post, and therefore should not be able to see the post content.

Furthermore, post permissions change over time. An authoring account may retroactively change post previously having a public status to a private status, retroactively change previously private post to have a public status, delete the post, delete the account, set the entire previously public account to have a private status, release a previously private or limited-access account to have a public status, or otherwise retroactively change the status of the post.

Because it is undesirable to send posts that the third party does not have permission to view to the third party in violation of privacy contracts and/or send post identifiers that link to post that the third party (e.g., wherein such links lead the third party to empty or otherwise unavailable post listings in a post feed provided by the post analysis system), the substantially up-to-date privacy settings associated with the post should be checked prior to sending the post or an identifier thereof to a third party.

Thus, there is a need in the social networking post analysis field to create a new and useful system and method for dynamic permissions determination. This invention provides such new and useful system and method for dynamic permissions determination.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
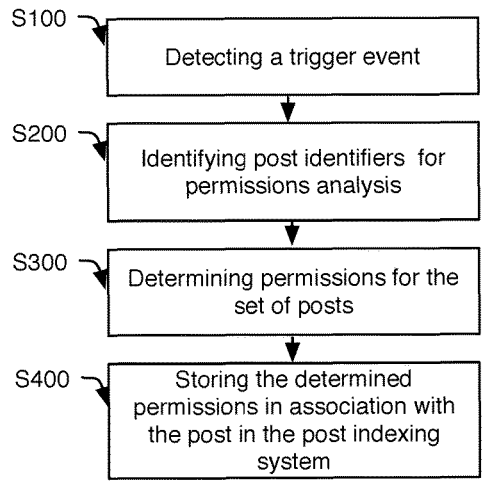
FIG. 1 is a flowchart diagram of the permissions verification method.

As shown in FIG. 1, the method for permissions verification includes detecting a trigger event S100, identifying a post for permissions analysis S200, determining permissions for the post S300, and storing the updated permissions in a post indexing system S400. The method can additionally include selectively enabling post access to a third party in response to the post permissions satisfying a permissions condition. The method can additionally include updating a stored permissions status for the post, updating a stored permissions status for the authoring user account, updating a stored permissions status for a second user account associated with the authoring user account, and updating the a stored permissions status for a secondary post authored by the second user account. The method functions to verify that a third party account or entity has access to any requested post, prior to post or post identifier transmission to the third party account. This can function to prevent private posts from being released to third parties, prevent third parties from attempting to utilize private or limited-access posts, and/or prevent third party frustration when the third party is unable to access the post due to a permissions change or post removal. All or a portion of the method can be automatically performed, performed in response to occurrence of a trigger event, or otherwise performed. All or a portion of the method can be performed in real-time, near-real time, or at any other suitable frequency. The method or portions thereof can be performed concurrently (e.g., in parallel), serially, or in any suitable order for the same set of posts, same set of user accounts, different set of posts, and/or different sets of user accounts.

The method preferably controls access and data flow between a post source (e.g., social networking system), a post analysis system, and a third party system, but can alternatively control data access between any other suitable set of computing systems. The post source (e.g., social networking system), post analysis system, and third party system are preferably separate and distinct systems or services (e.g., with different access permissions), but can alternatively be part of the same system or service.

1. Specific Example of the Method.

In a specific example of permissions verification utilization, the method verifies post permissions in an event detection system, wherein the post permissions are checked prior to granting third-party access to content streams for a detected event. The event detection system and method can be those disclosed in U.S. application Ser. No. 14/882,318 filed 13 Oct. 2015, incorporated herein in its entirety by this reference, but can alternatively be any other suitable event detection system.

Figure 8:
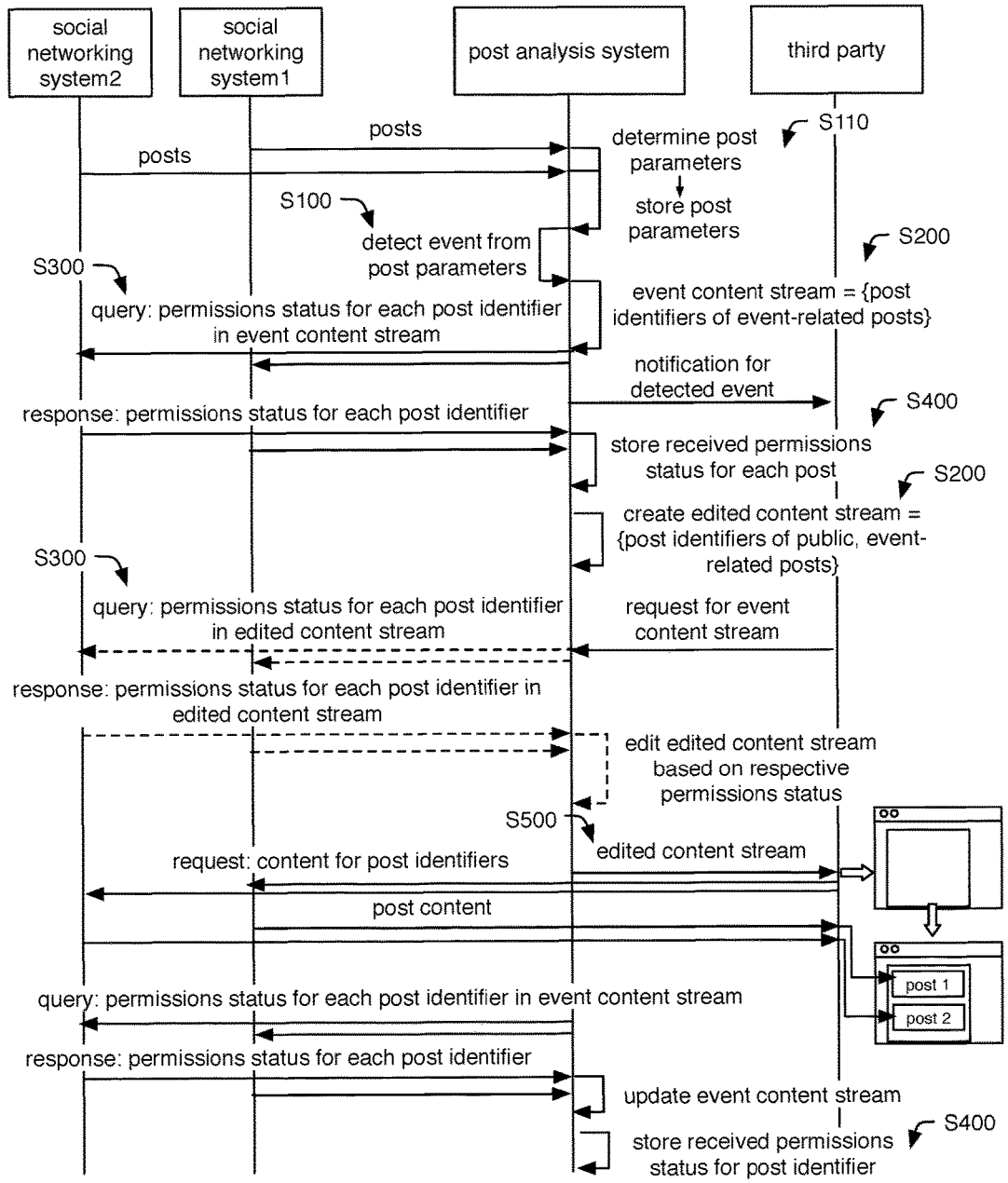
FIG. 8 is a schematic representation of a variation of performing the permissions verification method in an event detection application.

In this example (shown in FIG. 8), a user authors a post on the post source (e.g., social networking system) through a user account, and the post is transmitted to the post analysis system. The post analysis system receives the post and determines a set of posts parameter values for the post (e.g., based on the post metadata, content, context, etc.). The post analysis system can subsequently discard the post contents or retain the post contents. The post parameter values are preferably retained (e.g., irrespective of the post permissions status), but can alternatively be discarded in response to determination of a private permissions status for the post, or otherwise processed.

The post analysis system can additionally detect an event based on the post parameter values, add the identifier for the post (post identifier) to a content stream for the event, and notify a third party system of the event. The post identifiers for subsequent posts (authored by the same or different user accounts on the same or different post source) can be automatically added to the content stream upon determination that the respective post is associated with the event (e.g., based on the respective post's post parameter values, etc.), be added to the content stream upon determination that the respective post is associated with the event and has a public permissions status (e.g., such that only public posts are added to the event content stream), or be added to the content stream based on any other suitable set of conditions being met.

Upon receipt of a request for the event content stream from the third party, the post analysis system can: check the permissions for each post identified within the event content stream against the source social networking system, selectively remove post identifiers for now-private posts from the event content stream, selectively add post identifiers for now-public posts to the event content stream, and send the edited content stream to the third party system. The third party system can then view the content of the posts identified in the edited content stream, wherein the post content can: be sent to the third party as part of the edited content stream, be retrieved from the source (e.g., source social networking system) by the third party system based on the post identifier, or be otherwise received by the third party system. The third party system can additionally publish the post content to a public endpoint.

In a variant of the specific example, the post content is published through a widget (e.g., web browser widget) embedded within the public endpoint, wherein the widget periodically: receives the edited content stream, retrieves the post content from the source (e.g., source social networking system), and displays (e.g., publishes) the post content at the public endpoint. The widget can be part of the post analysis system, third party system, or any other suitable system. The post permission statuses can be checked each time the edited content stream is sent to the widget, or be checked at any other suitable frequency. The widget can be on the third party backend, be embedded within the web browser window opened by a consumer of the third party public endpoint, or be otherwise associated with the third party. Alternatively, the user-generated content can be broadcast (e.g., on a news outlet), published on a dashboard, provided to a third-party content analysis system, or otherwise utilized. However, user-generated content can be otherwise surfaced to the third party. However, the method can be used in any other suitable application.

2. Benefits.

This method can confer several benefits in solving the Internet-centric problem of user privacy. First, this method functions as an intermediary between the source (e.g., source social networking system) and the third party, such that the system provides an additional layer of privacy and security on top of that already provided by the post source (e.g., social networking system).

Second, variations of the method limit dissemination of user-generated content by only sending post identifiers to the third parties, wherein the third parties must retrieve the post content from the post sources (e.g., source social networking systems). This leverages the post sources' (e.g., social networking systems') privacy controls (in addition to the system's privacy controls), which will prevent release of the requested post content to the third party if the privacy settings have been changed in the interim (e.g., between post identifier transmission and post content request).

Third, variations of the method limit dissemination of user-generated content by checking the permissions status of the post and/or user account before transmission to a third party, such that only public content is released to third parties. This can additionally function to prevent post identifiers for private posts from being sent to the third party, which will prevent undesirable blank or unavailable frames from being shown at the third party endpoint.

Fourth, variations of the method discard the post content after post indexing, such that post content cannot be transmitted to the third party by the system, as it is not stored by the system. In some embodiments of these variants, the post content can be reduced to—and stored as—a set of post parameter values characterizing the post content. These embodiments can confer the additional benefit of storing relevant post information without storing the data-intensive post content itself.

Fifth, variations of the method can leverage the aforementioned post representations (e.g., the post parameter values, not the post itself, etc.) in secondary applications. This can function to increase event detection accuracy and/or precision, to train post parameter value determination algorithms, to refine relevant user-generated content identification algorithms, or be used in any other suitable manner in any other suitable secondary application. This can additionally function to identify and bookmark private posts that are relevant to an event (e.g., event posts), such that the posts can be rapidly added into a content stream for posts related to the event (e.g., event content stream). However, the method can confer any other suitable set of benefits.

3. System.

The method preferably controls access and data flow between a post source (e.g., social networking system), a post analysis system, and a third party system, but can alternatively control data access between any other suitable set of computing systems.

3.1 Post Analysis System.

The method is preferably performed by a post analysis system, which functions to control third-party access to user-generated content (posts). The post analysis system preferably accesses posts from the post source (e.g., social networking system), and selectively surfaces posts (or post identifiers) to the third party system. However, the post analysis system can receive post content from any other suitable source, and selectively surface the post (e.g., send the post identifier) to any other suitable endpoint.

Figure 4:
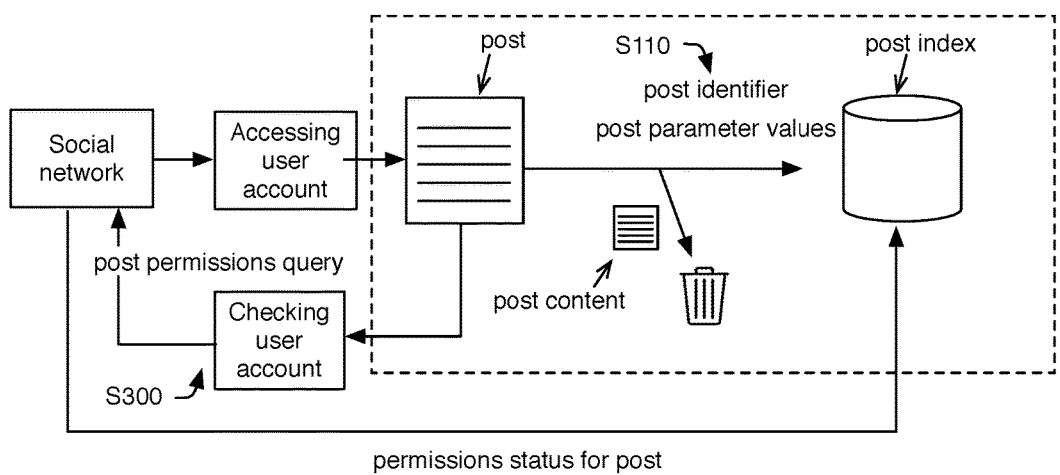
FIG. 4 is a schematic representation of a variation of the permissions verification method, including indexing the post.

The post analysis system can access the posts on the post sources (e.g., social networking systems) through the user accounts belonging to other users (enabled user account), as shown in FIG. 4, wherein the users had granted post analysis system access to the respective user account. However, the post analysis system can otherwise access the posts. The post analysis system is preferably capable of accessing the post available to the enabled user account (e.g., has read access to the user account), but is incapable of generating post on behalf of the enabled user account (e.g., has read-only access, but no write access, to the enabled user account). However, the post analysis system can have write-only access, read/write access, or any other suitable access to the enabled user account. The post analysis system is preferably permitted access to posts authored by the enabled user account, post authored by other user accounts to which the enabled user account has access (e.g., wherein the enabled user account is a friend of the authoring user account, wherein the post has friends-only privacy settings, public post, etc.), or any other suitable post. Alternatively or additionally, the post analysis system can access the post sources (e.g., social networking systems) through a public page or a public account (e.g., an account having little or no direct connections with other user accounts). However, the post analysis system can access the post on the post sources (e.g., social networking systems) in any other suitable manner. Posts can be pushed by the post source (e.g., social networking system) to the post analysis system in response to the post posting on the post source (e.g., social networking system), sent by the post source (e.g., social networking system) in response to a request sent by the post analysis system to the post source (e.g., social networking system) (e.g., wherein the request can be sent at a predetermined frequency or at any other suitable time), or sent to the post analysis system in any other suitable manner.

The post analysis system can additionally function to store parameter values, permissions status (e.g., current, updated, and/or historic), or any other suitable information for each post, user account, user, or any other suitable entity abstraction. The post analysis system preferably persistently stores the information, but can alternatively temporarily store or otherwise store the information.

For each post, the post analysis system can determine and store: a post identifier, post parameter values, a permissions status, and/or any other suitable information for the post. The post identifier preferably uniquely identifies the post, but can alternatively uniquely identify the post within the post source (e.g., social networking system), within the post analysis system, or otherwise identify the post. The post identifier can be a URI (e.g., supplied by the post source, such as a social networking system), system-assigned identifier, or any other suitable identifier. The post identifier is preferably used as a representative for the post, wherein all post information is stored in association with the post identifier within the post analysis system. However, the post information can be otherwise stored. The post content is preferably accessible on the post source (e.g., social networking system) through the post identifier, but can alternatively be otherwise accessed. The post parameter values are preferably automatically determined by the post analysis system in response to receipt of the post (e.g., in real or near-real time), but can alternatively be performed at any other suitable frequency. The post parameter values can be determined based on the post content, the post context (e.g., time, geographic location, etc.), or any other suitable post information. When the post parameter values are determined based on the post content, the post analysis system can receive the post content, determine the post parameter values based on the content, and discard the post content after post parameter value determination. Alternatively, the post content can be stored by the post analysis system. The post permissions status is preferably the most recently verified permissions status for the post, but can alternatively be a real-time status, a history of permissions statuses, or be any other suitable permissions status for the post. The post permissions status can be retrieved from the post source (e.g., the source social networking system from which the post was received), determined by attempting to access the post through a user account not connected to the authoring user account, or be otherwise determined.

For each user account, the post analysis system can determine and store: a user account identifier, user account login, a permissions status, identifiers for auxiliary user accounts associated with the user account, or any other suitable information for the user account. The user account permissions status is preferably the most recently verified permissions status for the user account, but can alternatively be a real-time status, the most restrictive current permissions status for any post authored by the user account (e.g., determined from a permissions summary for the user), a history of permissions statuses, or be any other suitable permissions status for the user account. The user account permissions status can be retrieved from the post source (e.g., social networking system), determined by attempting to access a post authored by the user account through a test user account not connected to the authoring user account, be determined as a summary of the permissions statuses of the posts authored by the user account, be determined based on the permissions statuses of auxiliary user accounts associated with the user account (e.g., wherein the permissions status for the user account is changed to match the permissions status for the auxiliary user account), or be otherwise determined.

The auxiliary user accounts can be on the same post source (e.g., social networking system) as the user account or on different post sources (e.g., social networking systems). The auxiliary user accounts are preferably associated with the same user as the user account, but can alternatively be associated with a different user. The auxiliary user accounts can be linked by the user to the user account (e.g., on the post analysis system, on the post source or social networking system, etc.), automatically determined by the post analysis system (e.g., based on a common email address between a first and second user account, based on common patterns of behavior, based on matching post content authored by the two accounts, etc.), or be otherwise associated with the user account. In one variation, the post analysis system can determine and store a user permissions status for a user, based on all social networking system user accounts associated with the user. However, the post analysis system can determine and store any other suitable set of information.

The post analysis system can additionally include or be connected to an event detection system configured to detect an event based on the post parameter values of one or more posts in real- or near-real time. In one example, the event detection system can be that disclosed in U.S. application Ser. No. 14/882,318. However, the post analysis system can include any other suitable event detection system. The event detection system can additionally function to identify posts associated with the detected event (event posts) and/or aggregate the event posts into an event content stream. The event posts can be posts geographically and temporally proximal the event geographic location and/or occurrence time, posts having content about or related to the event, posts having post parameter values substantially similar to the event's parameter values, or be any other suitable post of the plurality. The event detection system can additionally store the event parameter values (e.g., determined based on the event posts' parameter values, etc.), store post identifiers of the event posts in association with the event identifier, or store any other suitable information related to the event. However, the event detection system can function in any other suitable manner. However, the post analysis system can include any other suitable module configured to analyze and/or leverage the user-generated content in any other suitable manner.

The post analysis system preferably includes a set of servers, but alternatively or additionally includes a set of user devices (e.g., mobile devices, such as laptops, tablets, etc.) or any other suitable computing system. In one variation, the post analysis system includes a set of master modules (e.g., servers or processes) associated with a set of slave modules, wherein the master modules can identify the set of posts and distribute permission checking tasks for the set of posts amongst the respective slave modules. The posts within the set are preferably associated by a common parameter. For example, the posts can be associated by a common event to which it is related, common third-party entity, common post album (e.g., created by a third party entity, automatically generated in association with an event, etc.), or have any other suitable common parameter. Alternatively, the posts within a set can be unassociated. Alternatively, each slave module can be assigned the set of posts in its entirety. The slave modules preferably determine the privacy settings for the posts in parallel (e.g., substantially concurrently, independent of other slave module, etc.), but can alternatively determine the privacy settings serially or in any other suitable order. Each master module is preferably associated with one or more slave modules. Each slave module can be associated with a single master module, or be associated with multiple master modules. The master module preferably determines the checking priority for each post, but the slave module can alternatively determine the checking priorities for the post assigned to the respective slave server. However, the posts can be otherwise processed (e.g., post parameter values extracted, post permissions statuses checked, etc.) in parallel or in series.

3.2. User-Generated Content and Post Sources.

The method is preferably performed with a set of posts. The post (i.e., electronic messages, user-generated content, persistent content, persistent data, persistent post, etc.) preferably includes post content, but can alternatively or additionally include any other suitable information. Examples of post content include: images, video clips (e.g., temporally organized image frames), audio clips, text, links, URLs, references, and/or any other suitable content. The post is preferably generated by an authoring user through an authoring user account, but can alternatively be automatically generated or generated in any other suitable manner. The post is preferably authored by a single user account, but can alternatively be authored by multiple user accounts. The post is preferably generated on a social networking system, but can alternatively be a generated through any other suitable platform. The post is preferably generated on a single social networking system, but can alternatively be generated on multiple social networking systems or on any other suitable platform. The post is preferably received by the post analysis system from one or more online post sources (e.g., social networking systems) in real time, near-real time, at a predetermined frequency, or at any other suitable rate. Multiple posts can be concurrently received from the post sources. Alternatively, the post source can include news sources, blogs, or any other suitable post source. The method is preferably capable of accessing and aggregating posts from one or more post sources.

The post can additionally include metadata (i.e., an associated set of data properties). The metadata can include a timestamp, a geographic location (e.g., geotag, GPS coordinates, name of geographic location, etc.), a measure of location precision (e.g., radius of uncertainty), a categorization or identifier for the mobile device generating the post, a user account identifier, the post capture mechanism (e.g., front camera or back camera), or any other suitable parameter. The post metadata can be associated with the post by the user device creating the post, by the user account controlling creation of the post, by a secondary user account, by the post source (e.g., social networking system) receiving the post, by the computing system as part of the method, or associated with the post in any other suitable manner.

The post can additionally be associated with a time, location, permissions setting, or any other suitable parameter from the posts of the electronic message. For example, a geographic location can be determined for and associated with the post in the manner disclosed in Ser. No. 14/043,479 filed 10 Oct. 2013, incorporated in its entirety by this reference. However, any other suitable information can be determined and/or associated with the post in any other suitable manner. In another example, the post can include a textual reference to an event (e.g., through an event name, URL, or other suitable event identifier or reference), wherein the post can be associated with a known event time and event location associated with the event. In another example, an image can be processed to extract location or time-related metadata (e.g., exchangeable image file format data), extract a location from the image post (e.g., by image matching with a database), extract a location tag, or extract any other suitable information. In another example, the post can include text that references a location (e.g., a location name) and/or a time (e.g., a date, a time, a duration from the time of post generation, etc.), wherein the referenced location and/or time are the associated location and/or time. In another example, the post can reference a secondary source (e.g., a secondary user account), wherein post authored by the secondary user account includes a location and/or a time. The location and/or time associated with the primary post can be the referenced location and/or time found in the post authored by the secondary user account.

The post is preferably authored by a user at a user device, wherein the user device sends the post to the remote computing system or the secondary remote computing system. However, the post can be generated by any other suitable system. The user device can include one or more server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, vehicles, televisions, video players, tablets, or any other suitable user device. The devices can be stand-alone or networked. The device is preferably connected to the remote computing system (e.g., a server system, cloud computing system, distributed computing system, mesh network, database, etc.), but can alternatively be connected to any other suitable system. The device can be wirelessly connected to the remote computing system by a long range wireless connection, such as WiFi, a cellular network service, or any other suitable long range wireless connection, or be connected by a short range connection, such as radiofrequency, Bluetooth, near field, or any other suitable short range communication connection. Alternatively, the device can be connected to the computing system by a wired connection, such as a LAN line. The device can include a storage and/or memory device. The storage and/or memory device is one or more physical apparatuses used to store data or programs on a temporary or permanent basis. The device can include volatile memory and requires power to maintain stored information. The device can additionally or alternatively include non-volatile memory and retains stored information when the digital processing device is not powered. The device can additionally or alternatively include a display (e.g., LED, LCD, etc.) to send visual information to a user. The device can additionally or alternatively include an input device (e.g., keyboard, touchscreen, etc.) to receive information from a user.

Each post source is preferably an online service, platform, or site (e.g., digital social networking system, virtual social networking system, Internet-hosted social networking system, etc.) that preferably includes a plurality of user accounts, wherein each user account is preferably associated with a unique user. Examples of post sources include social networking systems, news outlets, user devices (e.g., configured to generate automatic updates), or any other suitable post source. Examples of social networking systems include Facebook, Twitter, LinkedIn, a digital group formed from linked email addresses, or any other suitable digital networking system. The post source preferably stores the generated post (e.g., the post content), but can alternatively facilitate persistent or temporary post storage on an external storage system.

The post generated by an authoring user account is preferably displayed on a user page or post feed (i.e., post stream) of the user account on the respective post source. The post feed for a user account can include user-generated content (e.g., content posted by the user account to the social networking service). The content feed for a user account can additionally or alternatively include content posted by secondary user accounts to the post source. The secondary user accounts can be user accounts that are followed, friended, or otherwise directly connected to the user account. Alternatively, the secondary user accounts can be accounts that are indirectly connected to the user account, or not connected to the user account. The post feed is preferably a time-ordered list (e.g., ordered according to the time of generation), more preferably inversely time-ordered with the most recent post at the top of the list, but can alternatively be ordered according to popularity (e.g., as determined from the number of views of the post, number of actions on the post, etc.), relevance, or ordered according to any other suitable parameter.

The post source (e.g., social networking system) can additionally store permissions settings (e.g., privacy settings) in association with the authoring user account or the post. The privacy settings are preferably selected by the authoring user account, but can alternatively be automatically determined or determined in any other suitable manner. In one variation, the user account can be associated with a privacy summary (e.g., user account privacy settings) summarizing access permissions to the user account and/or content generated by the user account. The privacy summary can include global access permissions (e.g., wherein the settings apply at an account level), access permissions for specific post sets (e.g., wherein different sets of posts can have different access permissions), the most restrictive access permission for all posts authored by the user account, or a summary of any other suitable access permissions for the user account and/or content generated by the user account. In a second variation, the user account can include a global privacy setting (e.g., wherein the settings apply at an account level), wherein a secondary user account would require access to the authoring user account, or be otherwise qualified, to view authored post and/or account information. For example, the secondary user account can fall within a category of account qualified to view the post, be included on a list of accounts that are permitted access, or be otherwise qualified to view or otherwise access the post. In a second variation, the post can be individually associated with a privacy setting (e.g., the permissions apply at a post or post level), wherein a secondary user account must qualify to view each specific post. In a third variation, a set of posts (e.g., posts sharing a common characteristic) can be associated with a common privacy setting. In a fourth variation, a set of user accounts (e.g., user accounts sharing a common characteristic) can be associated with a common privacy setting. However, the post source (e.g., social networking system) can store privacy settings for any suitable user account, posts (e.g., user-generated content), or combination thereof.

The privacy settings can be public, wherein access to the content is granted globally to all secondary user accounts and/or accessible without a user account (e.g., public); limited, wherein access to the content is granted to a predetermined or limited set of secondary user accounts or account categories; private, wherein access to the content is denied globally and accessible to only the authoring account; deleted, wherein access to the content is denied globally, even to the authoring account; or be granted to any other suitable set of secondary user accounts. In some variations, any privacy setting wherein access to the content is denied to a set of secondary user accounts or account categories can be classified as restricted. Examples of restricted settings include: limited settings, private settings, and deleted settings. However, any other suitable set of privacy settings with any suitable set of access permissions can be stored in association with the user account and/or posts.

Each unique user can be associated with a user account on one or more social networking services. The post analysis system can aggregate posts authored by one or more user accounts that are associated with a user. The user preferably indicates the user accounts associated with the user (e.g., usernames) for each of the social networking services to which the user belongs on the post analysis system, such as by entering and/or signing into each social networking service through the post analysis system (e.g., native application or browser application) signing into the post analysis system through OAuth, or otherwise linking one or more post source user accounts to the post analysis system. However, user accounts that are associated with the user across multiple social networking services can be otherwise determined.

3.3 Third Party System.

The third party account or entity is preferably interested in the post information (e.g., the post content, post identifier, post parameter values, etc.), but can alternatively be interested in the user account information, derivatory information (e.g., event parameter values, etc.), or in any other suitable information related to the posts. The third party entity is preferably not directly connected to the authoring user accounts on the post sources (e.g., social networking systems), but can alternatively be connected to the authoring user accounts. For example, the third party entity can be a media entity that distributes the post it receives. In one specific example, the third party entity can be a news source, wherein the news source can present the post through a secondary distribution channel (e.g., television, radio, etc.). Alternatively, the third party account or entity can be security personnel, wherein the post can be used to identify a security breach, altercation, or other security event. Alternatively, the third party account or entity can be a company, branding entity, or advertisement entity, wherein the entity can distribute the post through one or more advertising channels. Alternatively, the third party account or entity can be a financial entity, wherein the entity can utilize (e.g., analyze the post and perform subsequent methods based on the analysis), distribute the post, or use the post in any other suitable manner. However, the third party entity or account can be or be associated with any other suitable entity.

The third party entity is preferably associated with a third party system through which the third party entity accesses the post analysis system. The third party system can be a user device, server system, or be any other suitable computing system. In operation, the third party system can send a content request to the post analysis system, wherein the post analysis system can return content streams, post identifiers, post content, and/or other information requested by the content request. The content request can be: a curation request, wherein the post content is requested for third party curation of the content stream; a publication request, wherein the post content is requested for publication to a public endpoint (e.g., on air, on a public website, etc.); or be any other suitable request. The request can include an endpoint identifier (e.g., URI, etc.), wherein the requested, processed information is sent to the endpoint identifier, or include any other suitable information. The post analysis system can treat different content requests in the same manner or in different manners. In one example, the post analysis system can check the permissions statuses of the post identifiers sent to the third party system at a predetermined frequency when the content requests are curation requests, but re-check the permissions statuses of the post identifiers sent to the third party system immediately prior to post identifier transmission when the content requests are publication requests. However, the permissions statuses can be otherwise verified based on the content request type.

4. Method.

4.1 Detecting the Trigger Event.

Detecting a trigger event S100 functions to identify when updated permissions statuses (privacy settings, privacy status, access permissions) should be determined. The permissions status can be for a post, a plurality of posts, a user account on a post source (e.g., social networking system), or multiple user accounts on multiple post sources. Updating the permissions status upon determination of the trigger event can additionally function to reduce the processing load by selectively determining when the permission statuses for each post should be determined.

In a first variation, the trigger event can include receiving a new post from the post source (e.g., social networking system). This variation can function to determine the post's permission status as the post is received. New posts are preferably posts that have not been indexed and/or stored by the system, but can alternatively be any other suitable post. In this variation, the method can additionally include indexing the post Silo. Indexing the post can include processing the post in response to post receipt from the post source, determining post parameter values for the post (e.g., extracting post features and/or parameters from the post context and/or content), determining a post identifier for the post (e.g., assigning a unique post identifier to the post, extracting the post identifier from the post, retrieving the post identifier from the post source, etc.), and storing the post identifier, post parameter values, and other post information in a post index. The determined post permission status is preferably additionally stored with the post identifier in the post index, but can be otherwise stored. The new post can be automatically pushed to the system by the post source (e.g., in response to post posting on the post source). Alternatively, the new post can be received in response to a request sent by the system to the post source. The system can send the request at a predetermined frequency, in response to receipt of a query from a user (e.g., for a set of posts, for new post, for post satisfying a set of parameters, etc.), in response to determination of a permissions status change for a piece of co-authored post, or sent at any other suitable time. The request can include post parameter values, wherein the received post preferably satisfies the post parameter values. The post parameters can include temporal limitations (e.g., recurrent times, a defined timeframe, etc.), geographical limitations, authoring user account limitations, viewing user account limitations, subject matter limitations, media type limitations, or any other suitable restriction or lack thereof. The permission status for the new post can be determined for the new post in real- or near real-time, as the post is received from the post source. Alternatively, new post can be placed in a queue for permission status determination. Alternatively, the permission status can be determined at any other suitable time in response to receipt of new post.

Figure 6:
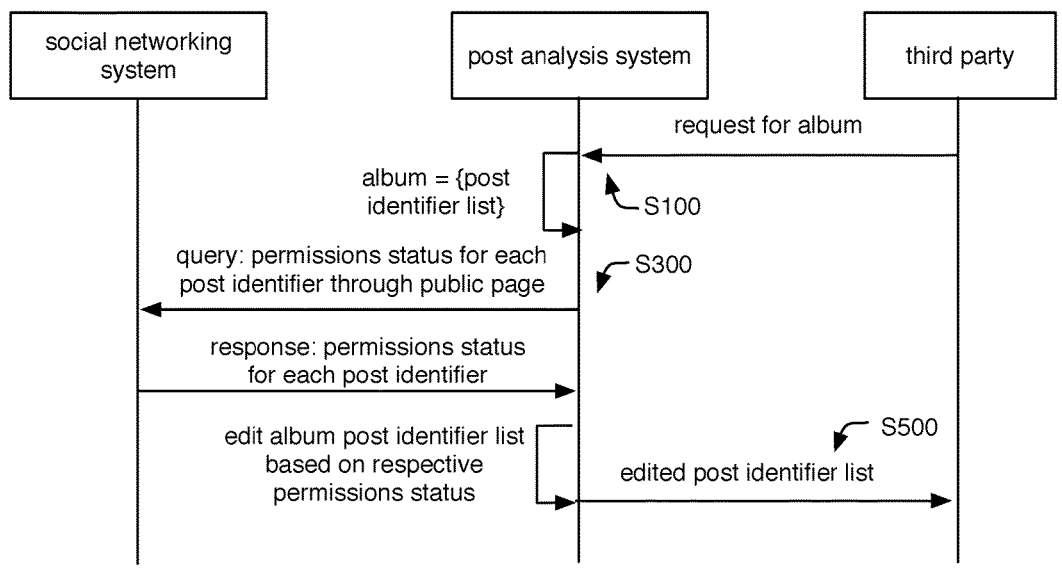
FIG. 6 is a schematic representation of a variation of performing the permissions verification method in response to receipt of a request to view a third-party user-created album of posts from the third party.
Figure 7:
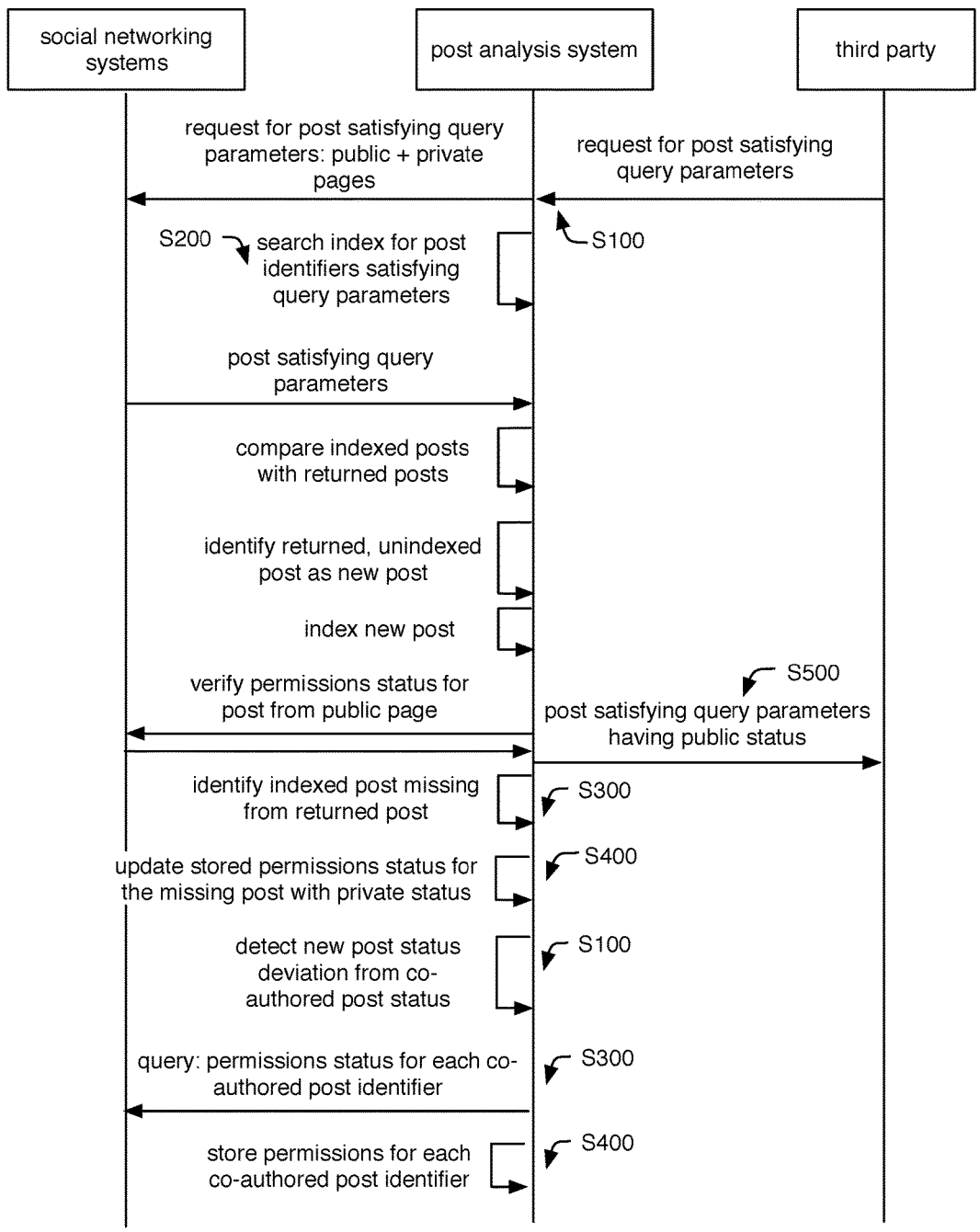
FIG. 7 is a schematic representation of a variation of performing the permissions verification method in response to receipt of a request to view posts satisfying a set of query parameters.

In a second variation, the trigger event can include receiving a request for the post from the third party. This variation functions to verify that the post to be sent to the third party satisfies a threshold permission status (e.g., has a public status) prior to post and/or post identifier transmission to the third party. The request can be a direct request for the post, or be an indirect request for the post. The request can be for the post identifier (e.g., the URI linking to the post on the post source), post content, post parameter value, summary of the post parameter values, content stream or album including the post identifier, or any other suitable information for the specific post. The request can be an album request, as shown in FIG. 6, wherein the post within a user-created album is requested. The request can be an event request, wherein posts associated with an event is requested. The request can be a search request (e.g., curation request), as shown in FIG. 7, wherein post substantially matching the search criteria (e.g., search terms, keywords, phrases, images, sound patterns, etc.) are requested. However, any other suitable post can be requested. The request is preferably received from the third-party account, but can alternatively be received from any other suitable endpoint. In this variation, the permissions for each post satisfying the request can be determined or verified before the post is sent to the requesting entity. Alternatively, the permissions for each post can be determined or verified as the entity is browsing though the list of post. The permissions for the post to be viewed can be determined as the post is coming into view at the third party device, determined immediately before the post is to be viewed, determined when a secondary post a predetermined number of spots ahead of the post is being viewed (e.g., anticipatory real-time permissions determination), or determined at any other suitable time. Alternatively, the post can be sent to the requesting entity as long as the post permissions were verified within a threshold time duration before post information transmission. However, the post permissions can be determined at any other suitable time.

In a third variation, the permissions status is determined at a predetermined frequency, wherein the trigger event can be the passing of a predetermined period of time since the last determination. The frequency of permissions determination for each post indexed by the system is preferably different, but can alternatively be the same. The frequency can be associated with a post set (e.g., an album, event content stream, etc.), individual posts, or with any other suitable set of posts.

The frequency of permissions status determination can be determined based on the request frequency for the post, more preferably the request frequency for the post set with which the post is associated but alternatively the request frequency for the post itself. For example, permissions for the post within a first set of posts can be verified at a first frequency, while permissions for the post within a second set of posts can be verified at a second frequency. The first frequency is preferably more frequent than the second frequency when the first set of posts is viewed or requested more frequently than the second set of posts is viewed or requested. However, the frequency of permissions status determination can be determined in any other suitable manner.

Alternatively, the frequency of permissions status determination can be determined based on the age of the post, wherein newer post can have a higher probability of being viewed, requested, included within a set of posts to be viewed or requested, or otherwise interacted with. The frequency can decay as a function of post age, post viewing probability, or any other suitable post parameter.

Alternatively, the frequency of permissions status determination can be determined based on whether the post is associated with an event and/or based on the event with which the post is associated. Higher frequencies can be selected for popular events (e.g., events having high request or viewing rates) or events predicted to be popular (e.g., based on machine learning techniques), and lower frequencies can be selected for post that are unassociated with any events. However, the frequency of permissions status determination can be determined in any other suitable manner.

In a fourth variation, the trigger event can include the post or user account identifier rising to the top of a queue for permissions determination. The post or user account can be placed in the queue in response to determination that the post or user account has a private permissions status, in response to determination that the permissions status of the post or user account has changed, or in response to any other suitable condition being met. The post or user account can be placed at the bottom of the queue, inserted partway within the queue, or otherwise added to the queue.

Figure 5:
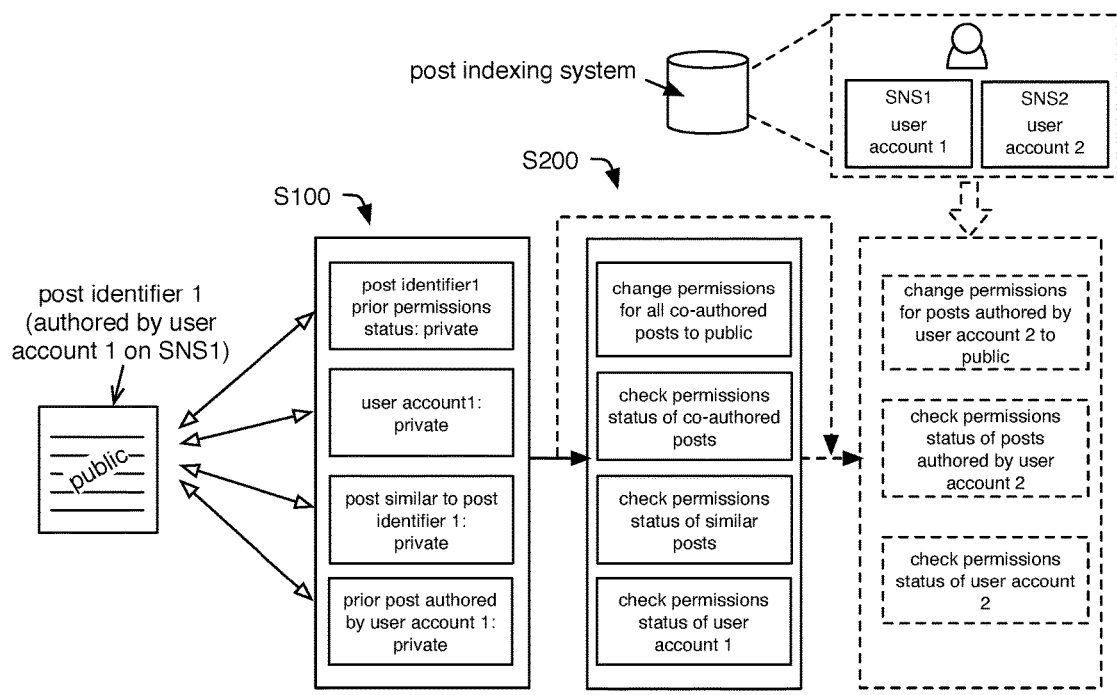
FIG. 5 is a schematic representation of multiple variants of detecting a set of trigger events and identifying post identifiers for permissions analysis.

In a fifth variation, the trigger event can include detecting a change in the pattern of permissions for a post, examples of which are shown in FIG. 5. In this variation, the method can include: determining the permissions status for a post, comparing the post's updated permissions status with a reference permissions status, and determining a difference (change, deviation, discrepancy) between the post's updated permissions status and the reference permissions status, wherein the difference between the updated permissions status and the reference permissions status functions as the trigger event. The reference permissions status can be the stored permissions status of the post (e.g., prior permissions status for the post, last permissions status for the post), the stored permissions status of the authoring user account, the stored permissions status of a prior post authored by the user account, the stored permissions status of a prior post authored by an auxiliary user account (e.g., second user account associated with the authoring user account; second user account associated with the same user as the authoring user account, etc.); the stored permissions status of a prior post, having similar post parameter values, authored by an auxiliary user account; the stored permissions status of an auxiliary user account; the stored permissions status for the majority of the posts authored by the user account or user (e.g., across all user accounts associated with the user); the anticipated permissions status for the post; or be any other suitable reference permissions status. The prior post can be the last post received from the respective user account or be any other suitable prior post authored by the respective user account. The prior post having similar post parameter values can be a post that shares subject matter, keywords, location, tags, recurrent times (e.g., time of the day, day of the week, etc.), parameter value patterns, or any other suitable parameter with the analyzed post. The anticipated permissions status for the analyzed post can be automatically or otherwise determined. For example, the anticipated permissions can be determined based on historical post co-authored by the user account and/or the user associated with the user account (e.g., posts from other social networking systems). The anticipated status can determined by an anticipation module (e.g., probability based on machine learning techniques, learned status assignment patterns) or be determined in any other suitable manner.

The difference between the post's permissions status and the reference permissions status is preferably determined when the permissions status for the analyzed post differs from the reference permissions status, but can alternatively be determined when any other suitable condition is satisfied. In a first example, the difference is detected when the post's permission status changes from private (the stored permissions status) to public (the updated permissions status) or vice versa. In a second example, the difference is detected when the post's updated permission status is private, but the stored user account permissions status is public, or vice versa. However, the difference can be otherwise determined. However, the trigger event can be any other suitable event.

In a sixth variation, the trigger event can include detecting a change in the pattern of permissions for a user account. In this variation, the method can include: determining the permissions status for the user account, comparing the user account's updated permissions status with a reference permissions status, and determining a difference (change, deviation, discrepancy) between the user account's updated permissions status and the reference permissions status, wherein the difference between the updated permissions status and the reference permissions status functions as the trigger event. The reference permissions status can be any of the reference permissions status described for the fourth variation, but can alternatively be any other suitable reference permissions status. The difference between the user account's permissions status and the reference permissions status is preferably determined when the permissions status for the analyzed post differs from the reference permissions status but can alternatively be determined when any other suitable condition is satisfied. In a first example, the difference is detected when the user account's permission status changes from private (the stored permissions status) to public (the updated permissions status) or vice versa. In a second example, the difference is detected when the user account's updated permission status is private, but the stored permissions status for the last received post is public, or vice versa. However, the difference can be otherwise determined. However, the trigger event can include the automatic addition of the post identifier to a content stream, manual addition of the post identifier to a content stream, receipt of a user input, or be any other suitable event.

4.2 Identifying a Set of Posts for Permissions Analysis.

Identifying a set of posts for permissions analysis S200 functions to limit the number of posts analyzed at any given time, or limit the number of posts queued for analysis. This can additionally or alternatively function to prioritize posts for permissions status analysis. The posts are preferably identified by the respective post identifiers, but can alternatively be identified by post content, post parameter value (e.g., media, associated keyword, etc.), or be otherwise identified. The set of posts can be identified after detection of one or more trigger events, be identified before occurrence of the trigger event (e.g., wherein occurrence of the trigger event triggers permissions statuses to be checked), or be identified at any other suitable time.

In a first variation, the set of posts can be old posts, or posts that have been previously analyzed by the system. Prior analysis can include prior permissions status determination, prior post indexing and information storage, or any other suitable analysis performed on the post. The old posts are preferably identified in response to an associated trigger event being met, but can alternatively be identified at any other suitable time. For example, old posts can be identified for permissions analysis in response to detecting a change in the pattern of post permissions in a second piece of co-authored post, in response to detecting a change in the pattern of permissions for the authoring user account, in response to detecting a change in the pattern of permissions for a post authored by an auxiliary user account, in response to detecting a change in the pattern of permissions for an auxiliary user account, in response to receipt of a request to view the post set with which the old post is associated, in response to the old post progressing within a permissions analysis queue, in response to a predetermined time period being met (e.g., wherein the permissions are checked at a predetermined frequency), in response to the post being associated with an unavailable, private, or deleted status, or in response to any other suitable trigger event. The old post can be included in previously defined post sets, indexed posts satisfying a set of search parameters (e.g., event posts), or any other suitable set of posts. The previously defined post sets (predefined post set) can be automatically compiled by the system, compiled by a user account (e.g., by the third party), or otherwise generated. In a first example, the predefined post set can be a set of posts associated with an event (e.g., an event content stream), wherein the posts within the set can be the underlying post from which the event was determined, posts having post parameter values substantially similar to the event parameter values, posts tagged with an event identifier, or any other suitable post associated in any other suitable manner with the event. In a second example, predefined post set can be a set of public posts associated with the event. In a third example, the predefined post set can be a set of posts having parameter values matching a request. However, the old post can be individual posts or any other suitable set of posts.

In a second variation, the set of posts includes new posts, or posts that had not been previously analyzed by the system (e.g., post that does not have a post identifier within the system). New posts can be identified for permissions analysis in response to new post receipt or in response to the occurrence of any other suitable trigger event. The new post can be a post that was authored or otherwise generated within a predetermined time duration (e.g., between a first and second unique timestamp) since a reference timestamp. The reference timestamp is preferably the last time post was received from the respective post source, but can alternatively or additionally be the last time post was received from the user account, the timestamp of the last post received from the post source or user account, or be any other suitable time. Alternatively or additionally, the new post can be a post, received from the post source, which has not been indexed by the system. This can be determined based on a comparison between the post index and the post received from the system, wherein the new post can be identified as post lacking representation (e.g., a post identifier or file) within the post index.

In one example, identifying the new post can include receiving a post satisfying a set of search parameters from a post source, comparing the returned post set with the indexed posts, and identifying a new post as posts within the returned post set that are not within the indexed posts. Examples of search parameters that can be used include a time limitation, a geographic region limitation, a specified set of user accounts, a specified set of events, a specified set of subject matter, a specified set of keywords, or any other suitable post parameter. Identifying the new post can additionally include requesting the post set from the post source (e.g., social networking system), wherein the request can be sent to the post source through a public page, through an account associated with the third party, through a set of user accounts, or sent through any other suitable channel. The indexed set of posts used for the comparison can be limited by the search parameters, limited by the post source (e.g., social networking system) from which the returned post is received, limited by the user accounts through which information is retrieved, or limited in any other suitable manner. Comparing the returned post set with the indexed post can include comparing unique parameters of the post (e.g., timestamps, authoring user account identifiers, post identifiers, etc.), but can alternatively include comparing post subject matter, keywords, or any other suitable post parameter. However, any other suitable set of posts can be determined in any other suitable manner.

4.3 Determining the Permissions Status for the Each of the Set of Posts.

Determining the permissions status for each of the set of posts S300 functions to determine whether the post content of each post within the set is available to the third party. However, whether the post content is available to the third party can be otherwise determined. The permissions status is preferably determined automatically upon detection of the trigger event, but can alternatively be determined upon user response to the trigger event or at any other suitable time. The permissions status of the user account, prior posts authored by the user account, auxiliary accounts, prior posts authored by auxiliary accounts, posts sharing post parameter values authored by secondary users (e.g., other event posts), or any other suitable set of posts can be determined in response to detection of the trigger event. The permissions status can be public, private to a subset of secondary user accounts, private to the authoring account only, or unavailable or deleted. However, any other suitable permissions status can be determined. The determined permissions status is preferably stored in association with the respective identifier (e.g., post identifier or user identifier) in the post analysis system, such that the permissions status can be used for subsequent comparison, but the permissions status can alternatively or additionally be used in any other suitable manner. A timestamp reflecting the time at which the permissions status was determined can additionally be stored in association with the post identifier.

Determining the permissions status for the identified set of posts (checking the permissions status) can include requesting information from a post source (e.g., social networking system) for the post, determining the permissions status based on the received information, and updating the index with the permissions status. However, the permissions status can be otherwise determined.

Requesting information from the post source (e.g., social networking system) (e.g., querying a social networking system for permissions information) functions to retrieve the permissions status from the post source or retrieve information from the post source such that the permissions status of the post can be inferred. The post source from which the information is requested is preferably the post source from which the post was received, but can alternatively be a linked post source, a separate and discrete post source, or any other suitable content source. The permissions information that can be requested, queried, retrieved, or otherwise obtained can include: the permissions status for the post, the permissions status for the authoring user account (e.g., privacy status, privacy summary, etc.), the permissions status for the post source, or any other suitable permissions information.

Figure 2:
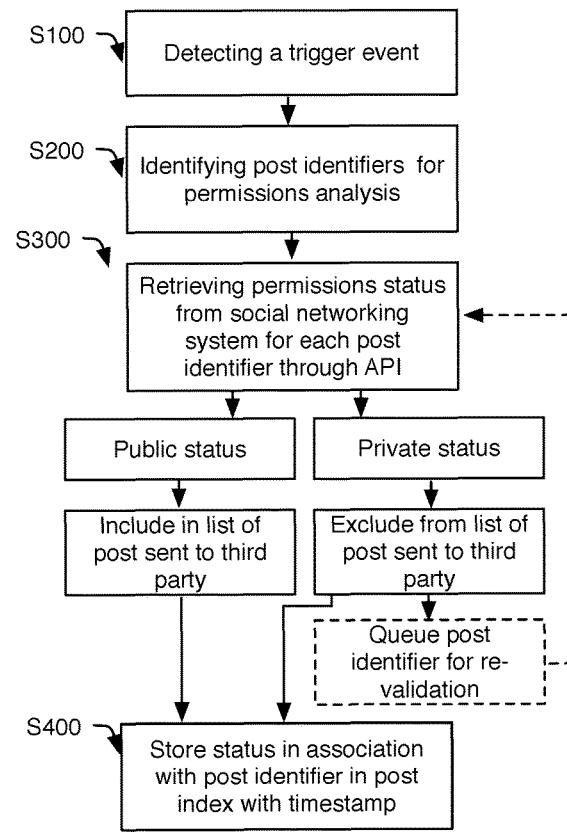
FIG. 2 is a flowchart diagram of a variation of the permissions verification method interfacing with a post source (e.g., social networking system) through an API.

In a first variation, the post source provides an API (application programming interface) or other resource through which information can be requested and received. In this variation, the permissions status for the post or user account can be directly requested from the post source, through the API, based on the respective identifier or other representation for the post or user account, wherein the received permissions status is subsequently recorded in association with the post identifier or user account identifier in the post index, as shown in FIG. 2.

Figure 3:
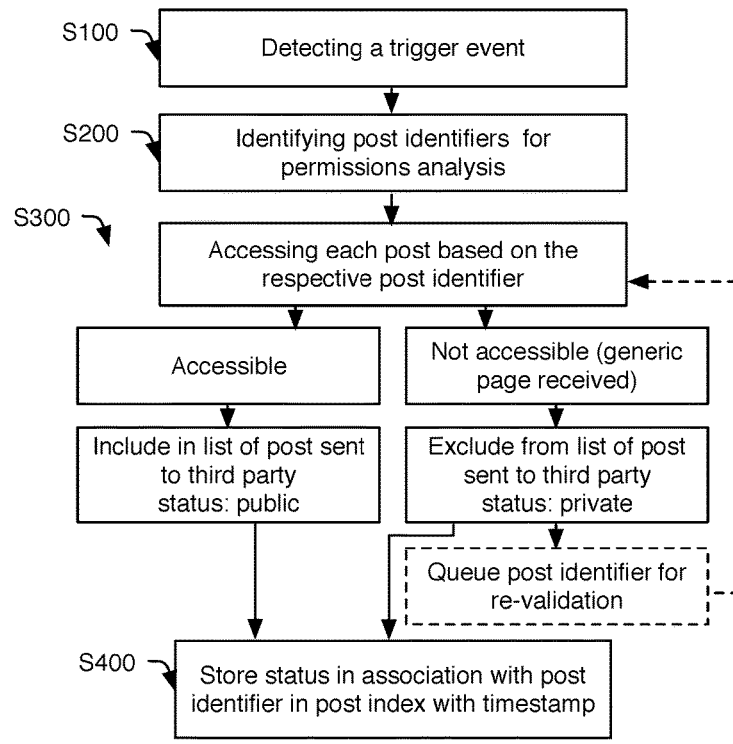
FIG. 3 is a flowchart diagram of a variation of the permissions verification method interfacing with a post source (e.g., social networking system) through user accounts.

In a second variation, as shown in FIG. 3, the system can attempt to directly access the post or authoring user account through the post source. This can be particularly useful if the post source does not provide an API or other channel through which the permissions status can be directly queried. In this variation, the system can request the post using the post identifier or other post representation (e.g., a URL), request the authoring user account using the user account identifier or other representation stored in the post index, or request any other suitable information from the post source. The system can request the post through one or more user accounts, such as the authoring account (e.g., wherein the permissions status for the post is directly retrieved or queried), a secondary account directly connected to the authoring account in the post source, a secondary account not directly connected to the authoring account, through a public page (e.g., not logged into the post source), and/or request the information from the post source through any other suitable login state. One or more attempts at accessing the information through different login states can be made concurrently, serially, or in any other suitable order. For example, the system can attempt to access the information (e.g., post or authoring user account) through a public page (e.g., through a logged-out state), attempt to access the information through the authoring user account in response to failure to retrieve the information through the public page, and attempt to retrieve the information through a secondary user account connected to the authoring user account in response to information retrieval through the authoring user account. However, any other suitable information can be requested in any other suitable manner or order from the post source.

In a third variation, the system can request posts satisfying a set of search parameters from the post source (e.g., social networking system), wherein the request can be sent through multiple accounts (e.g., through both the logged-in state and logged-out state), a single account, or through any other suitable set of accounts. The returned posts are then compared against the indexed posts. In response to determination that an indexed post is no longer in the returned post set, the permissions for the deviant post can be changed to private or deleted. Permissions determination for posts authored by auxiliary user accounts can additionally be triggered based on the discrepancy. This can be triggered whether or not the post was received from a post source with post-level permissions or only account level permissions. In the former case, all or a subset of co-authored posts (e.g., more recent posts authored by the user account, posts sharing a common post parameter, etc.) can be analyzed. In the latter case, a single co-authored post can be analyzed to verify the account level permission change. However, any suitable volume of posts can be analyzed at any other suitable time.

Determining the permissions status based on the received information functions to interpret the received information to determine the current permissions status of the post under review. The determined permissions status for the post can additionally be used as or be used to determine the permissions status of an authoring user account and/or all posts authored by the account. For example, when the post source is known to only have account-level permissions, the permissions status of a single post will be used as (e.g., stored as) the updated permissions status of the authoring user account and all posts authored by the account.

In a first variation, the returned permissions status that is received from the post source in response to a query for the permissions status is considered the current permissions status for the post or user account. For example, the returned permissions status for a post can be treated as the current post permissions status, and the returned permissions status for a user account can be treated as the current permissions status for the user account and/or posts previously authored by the user account (e.g., all previously authored posts, a subset of previously authored posts, etc.).

In a second variation, the current permissions status is inferred based on the accessible information and the means through which the attempted information access was made. In a first embodiment, the post permissions status can be inferred from the presence or absence of returned post content. For example, if the post was accessible through a public page (e.g., non-default information was returned, wherein default information can be an access denial, error, or other default information), a public permissions status can be assigned to the respective post as the post's current permissions status. Additionally or alternatively, if default information is returned, the permissions can be determined from the returned default information. For example, the post can be associated with a private permissions status when the returned information is a first set of default information (e.g., access denial), and be associated with a deleted permissions status when the returned information is a second set of default information (e.g., information not found). If the post was inaccessible through the public page but accessible through the authoring user account, then the post can be associated with a private permissions status. If the post was accessible through the authoring user account but inaccessible through a secondary user account connected to the authoring user account, then the post can be associated with a private, author only access. If the post was inaccessible through the public page but accessible through the secondary user account connected to the authoring user account, then the post can be associated with a private, limited access status. In a specific example, the post permissions status determination can only include attempting to access the information or user account through the public page, which can function to reduce the number of processing steps and increase the speed of analysis. This specific example can be used for permissions status verification before real-time display, or be used in any other suitable manner.

In a second embodiment, the post permissions status can be determined based on the user account permissions status (e.g., be updated to match the current user account permissions status). The user account permissions status can be assigned as the post permissions status, or the post permissions status can be individually determined. For example, the current permissions status for all posts authored by a user account can be set to a private status in response to the user account permissions status (e.g., user account permissions summary) being private. In a specific example, if the user account is inaccessible through the public page, then all posts authored by the user account can be updated with a private status within the post index module. In a second example, the current permissions status for all posts authored by a user account can be set to a public status in response to the user account permissions status (e.g., user account permissions summary) being public. In a specific example, if the post is accessible through the public page and the user account is on a post source with only account-level permissions, all posts authored by the user account can be assigned a public status within the post index module. In a third example, the current permissions status for all posts authored by a user account can be individually checked in response to the user account permissions status (e.g., user account permissions summary) being public. In a specific example, if the post is accessible through the public page and the user account is on a post source with post-level permissions, the permission settings for each post indexed within the post index module authored by the user account can be individually analyzed for. However, the post permissions status can be otherwise determined based on the permissions status of the authoring user account.

In a third embodiment, the authoring user account permissions status can be determined based on the post permissions status. In a first example, the user account permissions status can be set to mirror the current permissions status. This can be used when only account-level permissions are available on the respective post source, or when post-level permissions are available on the respective post source (e.g., wherein the post analysis system identifies and applies the most restrictive permissions access found within the set of authored posts). However, the authoring user account permissions status can be otherwise determined based on the post permissions status.

In a fourth embodiment, the user account permissions status can be determined based on the permissions status of an auxiliary account. This embodiment can assume that a user wants the most current permissions status to apply to all user accounts associated with the user across all post sources (e.g., all social networking systems). The user account permissions status can mirror the permissions status of an auxiliary account, be more restrictive than the auxiliary account permissions status, be less restrictive than the auxiliary account permissions status, or be otherwise related to the auxiliary account permissions status. In a first example, the user account permissions status can be set to private in response to determination that the permissions status of an auxiliary user account is private. In a second example, the user account permissions status can be set to public in response to determination that the permissions status of an auxiliary user account is public. In a third example, the user account permissions status can be checked in response to determination that the permissions status of an auxiliary user account is public. However, the user account permissions status can be otherwise determined.

In a fifth embodiment, the system can attempt to access the post and/or user accounts through the user account of the third party entity, wherein the post can be assigned an available status for the third party when the post is accessible, and assigned an unavailable status for the third party when the post is inaccessible. However, the permissions status can be otherwise determined.

4.4 Storing the Updated Permissions in the Post Indexing System.

Updating the post index with the permissions status S400 functions to record the newly-determined permissions status as the stored permissions status for the post. Updating the index can include storing the determined status in association with the respective post identifier, the authoring user account, or in association with any other suitable data structure. The permissions status can be stored with a determination timestamp or be stored independent of a timestamp. In a first example, the stored permissions status for the post can be set to a private status in response to the retrieved permissions status for the post or authoring user account including restricted access (e.g., private access, limited access, deleted, etc.). In a second example, the stored permissions status for the post can be set to mirror the retrieved permissions status for the post or authoring user account. In a third example, the stored permissions status for the post can be set to public in response to the retrieved permissions status for the post or authoring user account including public access. However, the stored permissions status can be otherwise updated.

The stored permissions status can be subsequently used as a reference permissions status, used to filter the post identifiers before transmission to the third party system, or be used in any other suitable manner. The recorded status can additionally be used to waive permissions determination. For example, if the permissions status of a post was determined within a predetermined period of time of a reference time (e.g., determined recently, such as within the last minute, the last 30 seconds, last hour, etc.), the identifier for the respective post can be sent to the third party entity without re-determining the permissions status. Alternatively, the private post, while relevant to the third party's query, can be left out of the set of post identifier sent to the third party. However, the recorded status can be otherwise used. Alternatively, the system can discard the recorded status after determination without storing the status.

The post information (e.g., post identifier, post parameter values, etc.) is preferably stored by the post indexing module after post permissions status determination (e.g., regardless of the post permissions status), but can alternatively be selectively discarded based on the post permissions status (e.g., information for private posts discarded, etc.), discarded after post permissions status determination, or otherwise post-processed. The retained post information is preferably subsequently used for population-level post analysis, such as dynamic event determination. Furthermore, the post information is preferably retained because the permissions status of the respective post may change (e.g., be changed by the authoring user account from private to public) or have been incorrectly determined (e.g., wherein the unavailable status was determined because the post source server hosting the post was down or otherwise unavailable), where re-determination of the post information can constitute a waste of processing power. However, the post information can be discarded or otherwise processed in response to determination of the permissions status.

4.5 Re-Evaluating the Permissions Status for a Set of Posts.

The method can additionally include re-evaluating the permissions status for a set of posts, which functions to identify posts whose permissions statuses have been changed from private to public. The permissions status is preferably re-evaluated in response to the occurrence of a trigger event, but can alternatively be re-evaluated at any other suitable time.

In one variation, re-evaluating the permissions status includes queuing posts having private or deleted status for re-evaluation. This can function to determine whether the post was truly private or deleted, or if the post was categorized as private or deleted because the portion of the post source hosting the post was unavailable. For post sources that enable per-post permission statuses, the system can stop re-queuing the same private or deleted post (post identifier) for re-evaluation after the post has been checked a predetermined number of times (e.g., three times), has been checked after a predetermined period of time (e.g., after 2 days), or has been checked after any other suitable condition has been satisfied. However, the system can continually re-queue the post as long as the post has a predetermined status (e.g., private or deleted, etc.). For post sources that only enable account-level permissions status, the system can stop re-queuing private or deleted post from the authoring account after any post from the authoring account has been checked a predetermined number of times, checked after a predetermined period of time, or checked after any other suitable condition has been satisfied.

Additionally or alternatively, the method can include re-queuing the post in response to determination that the post has a public status, which can function to verify that the public status of the post or authoring account has not changed. The status of the public post can be checked when a request for the post is received, or updated upon the occurrence of any other suitable trigger event. Alternatively, the method can determine the respective permissions status only in response to a request to view the post.

In a second variation, re-evaluating the permissions status includes: receiving a new post having a different permissions status from the stored status for prior, co-authored posts and/or the authoring user account; and determining the permissions status for the authoring user account or the prior, co-authored posts in response to new post receipt. In a specific example, re-evaluating the permissions status includes: receiving a new post with a public permissions status, wherein the stored permissions status for the authoring user account and/or prior posts is private; and determining the permissions status for the authoring user account and/or prior posts in response to receipt of the new post with the public permissions status.

In a third variation, re-evaluating the permissions status can include: receiving a new post having a different permissions status from the stored status for an auxiliary account and/or prior posts authored by the auxiliary account; and determining the permissions status for the authoring user account, auxiliary user account, and/or prior posts authored by the auxiliary account. In a specific example, re-evaluating the permissions status includes: receiving a new post with a public permissions status authored by a first user account; identifying auxiliary accounts to the first user account, wherein the stored permissions status for the auxiliary user accounts and/or prior posts authored by the auxiliary account is private; and determining the permissions status for the auxiliary user account and/or prior posts authored by the auxiliary account in response to receipt of the new post with the public permissions status.

In a fourth variation, re-evaluating the permissions status can include: aggregating a set of posts sharing a common characteristic (e.g., event posts) into a content stream, regardless of the respective posts' permissions status; creating an edited content stream including the public posts from the content stream; periodically checking the permissions status for each post identified within the post set; and maintaining the edited content stream by adding newly-public posts to the edited content stream and removing newly-private posts from the edited content stream. However, the permissions statuses can be otherwise re-evaluated.

4.6 Selective Post Transmission

The method can additionally include selectively transmitting the post, or a representation thereof (e.g., post identifier), to a third party system S500. This can function to enable a third party to access and/or view the post content. Selective post transmission to the third party can include: receiving the post set request (e.g., request for a set of posts), determining the post permissions status for each post within the post set after post set request receipt, and selectively transmitting the posts satisfying a set of post parameter conditions (e.g., only posts with public permissions statuses) to the third party after the post permissions status for the post has been updated. However, the post can be otherwise selectively transmitted in response to the satisfaction of any other suitable set of conditions. The requested post set can be a pre-aggregated post set, such as an automatically generated event content stream (e.g., including a set of posts associated with the event), a pre-curated content stream, or any other suitable predetermined post set stored by the post analysis system; be an undetermined post set; or be for any other suitable set of posts.

In a first variation, selectively transmitting the posts satisfying a set of post parameter conditions includes transmitting only posts or post identifiers associated with a public permissions status, unrestricted permissions status, and/or public user account to the third party. In a second variation, selectively transmitting the posts satisfying a set of post parameter conditions includes transmitting only posts or post identifiers with public permissions statuses or posts available to the third party system to the third party. However, post identifiers associated with any other suitable permissions status can be selectively released to the third parties. However, posts having any other suitable permissions status can be sent to the third party system.

In a first example, selectively transmitting posts to the third party system includes: receiving a query from the third party system, automatically aggregating post identifiers for posts with public permissions statuses and satisfying the query into a post set (e.g., content stream), and transmitting the post identifiers within the post set to the third party system. This example can additionally include: checking the permissions status for each post identified within the post set prior to post transmission, and removing posts with non-public permissions statuses (e.g., restricted statuses, private statuses etc.) from the post set.

In a second example, selectively transmitting posts to the third party system includes: receiving a query from the third party system, automatically aggregating post identifiers for all posts satisfying the query into a post set (e.g., content stream), checking the permissions status for each post identified within the post set, removing posts with non-public permissions statuses (e.g., restricted statuses, private statuses etc.) from the post set, and transmitting the post identifiers within the edited post set to the third party system.

In a third example, selectively transmitting posts to the third party system includes: aggregating post identifiers sharing a common characteristic (e.g., aggregating event posts) into a post set; periodically checking the permissions status for each post identified within the post set; maintaining an edited post set including the public posts from the post set (e.g., by adding newly-public posts to the edited post set and removing newly-private posts from the edited post set); receiving a query from the third party system for the post set (e.g., after post set aggregation and edited post set maintenance, alternatively at any other suitable time); and transmitting the edited post set to the third party in response to query receipt. However, the post sets can be otherwise monitored to only release public post content.

Upon receipt of the post identifiers, the third party device can then retrieve the post identified by the post identifiers from the respective post sources. Because the post permissions statuses were verified as accessible prior to third party post identifier transmission, third party confusion due to missing post can be minimized by eliminating the post identifiers for post that is inaccessible to the third party from the list. However, third party access to the post content can be otherwise provided.

4.7 Third Party Interactions.

The method can additionally include enabling third party communication with the authoring user account, such that the third party can ask the authoring user account for permission to distribute the authored post. In a first variation, the method includes embedding authoring user account information (e.g., contact information) in the post list sent to the third party, such that third party selection of the post or an associated icon can link the third party to a contact form accessed through the authoring user account information. Additionally or alternatively, the contact form can be a contact form provided by the source post source.

The method can additionally include enabling third party contact with the subject of the media (e.g., a second user of whom the picture is of), wherein the subject information (e.g., subject's user account, subject's contact information) can be determined during post indexing and/or permissions determination (e.g., through tags associated with the post) and associated with the respective post identifier sent to the third party. However, method can enable third party contact with any other suitable set of users.

An alternative embodiment preferably implements the above methods in a computer-readable medium storing computer-readable instructions. The instructions are preferably executed by computer-executable components preferably integrated with a post analysis system. The post analysis system can include a post retrieval system, a post index system, and a post analysis system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

We claim:

1. A method for user-generated content privacy control, comprising:
   receiving a plurality of posts from a plurality of social networking systems, each post of the plurality of posts uniquely identified by a post identifier and authored by a different user account on the respective social networking system;
   storing a stored permissions status for each post of the plurality of posts;
   detecting an event within a geofence in near-real time, comprising:
      determining post parameter values of the plurality of posts, the post parameter values comprising a keyword frequency of a keyword within geofence posts, wherein the geofence posts comprise posts of the plurality of posts that are associated with the geofence; and
      detecting the event in response to a frequency of the post parameter values deviating from a predetermined frequency for the geofence, comprising detecting the event in response to the keyword frequency exceeding a historic keyword frequency for the geofence;
   aggregating post identifiers for posts of the plurality of posts related to the event into an event content stream for the event;
   receiving a request for the event content stream from a third party;
   in response to receipt of the request, for each post identifier within the event content stream: checking a permissions status for the respective post with the respective social networking system from which the respective post was received for a permissions status of the respective post;
   generating an edited event content stream by removing post identifiers associated with private permissions statuses from the event content stream after checking permissions statuses for each post identifier within the event content stream; and
   sending the edited event content stream to the third party.

2. The method of claim 1, wherein aggregating post identifiers for posts of the plurality of posts into an event content stream comprises aggregating identifiers for posts of the plurality of posts having public stored permissions statuses into the event content stream.

3. The method of claim 1, further comprising:
in response to storing the stored permissions status for each post of the plurality of posts, comparing the permissions status of each post of the plurality of posts with a stored permissions status for the respective authoring user account; and
in response to determination of a discrepancy between a post permissions status and the stored permissions status for the respective authoring user account:
querying the respective social networking system from which the post was received for a second permissions status of the respective user account; and
updating a stored permissions status for each post authored by the respective user account in response to the second permissions status comprising a different permissions status from the stored permissions status.

4. The method of claim 3, wherein updating the stored permissions status comprises setting the stored permissions status for all posts authored by the respective user account to private in response to the second permissions status comprising a private status.

5. The method of claim 1, further comprising:
receiving a second post having a public permissions status from a first social networking system of the plurality of social networking systems, the second post authored by a user account that authored a first post of the plurality of posts, the user account having a private stored permissions status;
querying the first social networking system for a permissions status of each post authored by the user account; and
updating the stored permissions status of each post authored by the user account to match a received permissions status, received from the first social networking system, for the respective post.

6. The method of claim 1 further comprising:
determining a geographic identifier and a timestamp for each post of the plurality of posts;
wherein the geofence posts are posts of the plurality of posts that are associated with geographic identifiers within the geofence and associated with timestamps within a predetermined time duration of the first time; and
wherein the post identifiers for the posts of the plurality of posts related to the event comprise post identifiers for geofence posts that are associated with the first geographic identifier and with the detected event, as determined based on the respective post parameter values.

7. The method of claim 6, further comprising validating the event prior to sending the event notification, wherein validating the event comprises:
determining an anomaly probability for the post, based on historic posts from the authors of the event posts and historic posts associated with the geofence; and
validating the event in response to the anomaly probability exceeding a threshold anomaly probability.

8. The method of claim 6, wherein the user account represents a news entity, the method further comprising:
receiving post identifier selections from the content stream from the news entity;
aggregating the post identifier selections into a publication stream; and in response to receipt of a live broadcast request from the news entity, concurrently:
providing the publication stream to the news entity; and
updating the content stream and event parameter values based on the subsequently received posts received from the set of social networking systems.

9. The method of claim 8, further comprising:
receiving an endpoint URI from the first user account;
classifying the endpoint URI as the live broadcast request; and
ceasing content stream updating in response to publication request receipt;
wherein sending the event content stream to the user account comprises sending the content stream to the endpoint URI.

10. A method for user-generated content privacy control, comprising, at a computing system:
a) concurrently monitoring a plurality of social networking systems for posts;
b) detecting an event in near-real time within a geofence in response to a keyword frequency, determined from geofence posts, exceeding a historic keyword frequency for the geofence, wherein the geofence posts comprise a subset of the posts that are associated with the geofence;
c) aggregating post identifiers for event posts associated with the event into a content stream;
d) transmitting the content stream to a third party;
e) receiving a request, from the third party, for a first post identifier of a first post within the content stream, the first post authored by a first user account on a first social networking system of the plurality of social networking systems, the first social networking system separate and distinct from the computing system;
f) in response to receipt of the request, checking a permissions status of the first post, comprising:
querying the first social networking system for the permissions status of the first post, receiving the permissions status of the first post from the first social networking system, and updating a stored permissions status for the first post identifier to match the received permissions status of the first post; and
querying the first social networking system for a permissions status for the first user account in response to the received permissions status of the first post comprising a private status;
g) updating stored permissions statuses for a set of post identifiers for posts authored by the first user account in response to the permissions status comprising a private status;
h) generating an edited content stream comprising the first post identifier in response to the first post having a public stored permissions status after updating the stored permissions status for the first post identifier to match the received permissions status of the first post; and
i) sending the edited content stream to the third party.

11. The method of claim 10,
wherein concurrently monitoring the plurality of social networking systems for posts comprises receiving a plurality of posts from the plurality of social networking systems;
wherein detecting the event comprises detecting a news event within the geofence in near-real time at a first time from the posts, wherein the posts were posted to the respective social networking system within a predetermined time duration from the first time;

the method further comprising:
  determining event parameter values based on post parameter values extracted from the event posts;
  receiving event parameter requirements from the third party;
  in response to the event parameter values satisfying the event parameter requirements, sending the content stream to the third party;
  receiving, from the third party, selections of post identifiers from the content stream;
  in response to receipt of the request from the news entity, concurrently:
    providing the content stream to the third party; and
    repeatedly verifying the permissions status of the selected post identifiers and updating the stored permissions status for the selected post identifiers.

12. The method of claim 11, further comprising:
  receiving the plurality of posts, each generated by a different author, from the plurality of social networking systems;
  associating a geographic identifier and timestamp with each post; and
  extracting post parameter values from each post;
  wherein the geofence posts are posts of the plurality of posts that are associated with timestamps within a threshold time period of the first time and associated with the geofence through the respective geographic identifiers, wherein the news event is detected based on post parameter values of the geofence posts, and wherein the geofence posts comprise the event posts.

13. The method of claim 12, wherein detecting the news event further comprises:
  determining an event probability for the geofence based on a first subset of the geofence post parameter values;
  categorizing the event with an event category based on a second subset of the geofence post parameter values, different from the first subset; and
  determining a news probability for the geofence based on the event categorization, the event probability, and a third subset of geofence post parameter values, different from the first or second subset, wherein a news event is detected in response to the news probability exceeding a threshold news probability.

14. The method of claim 13, wherein the event parameter requirements comprise a monitored category, wherein the event parameter values satisfy the event parameter requirements when the event category falls within the monitored category.

15. The method of claim 12, further comprising:
  determining an event identifier from the post parameter values for the event posts;
  associating the event identifier with the event posts;
  receiving a timeframe request from the third party for the event identifier, the timeframe request comprising a start and end time;
  identifying event posts that are associated with the event identifier and a timestamp falling between the start and end time;
  checking privacy settings for each identified event post; and
  sending identifiers for the event posts that are public to the third party.

16. The method of claim 10, further comprising:
  for each post of the plurality of posts, determining a geographic identifier, timestamp, and set of post parameter values based on the respective post;
  for the geofence and predetermined timeframe, identifying event posts, wherein the event posts are posts of the plurality of posts that are associated with geographic identifiers located within the geofence and timestamps within the predetermined timeframe;
  receiving a predetermined logo from a branding entity;
  identifying brand posts from the event posts, each brand post comprising an image with a portion of the predetermined logo;
  aggregating post identifiers for the brand posts into a content stream;
  for each brand post within the content stream, checking a privacy status for the brand post;
  sending the content stream to the third party;
  receiving, from the third party, a selection of a post identifier of the content stream and an endpoint URI; and
  sending the selected post identifier to the endpoint URI at a publication time in response to receipt of the selection.

17. The method of claim 16, further comprising:
  determining a measure of exposure for the brand post identified by the selected post identifier; and
  sending the measure of exposure to the third party.

18. The method of claim 17, wherein determining the measure of exposure for the brand post identified by the selected post identifier comprises determining a total number of views of the image of the brand post, comprising:
  tracking a first number of views at the endpoint identified by the endpoint URI;
  determining a second number of views from the social networking system from which the event post was received; and
  determining the number of views based on the first and second number of views.

19. The method of claim 18, wherein determining the second number of views from the social networking system from which the brand post was received comprises estimating the second number of views based on a social graph of the respective author within the social networking system.

* * * * *